United States Patent Office

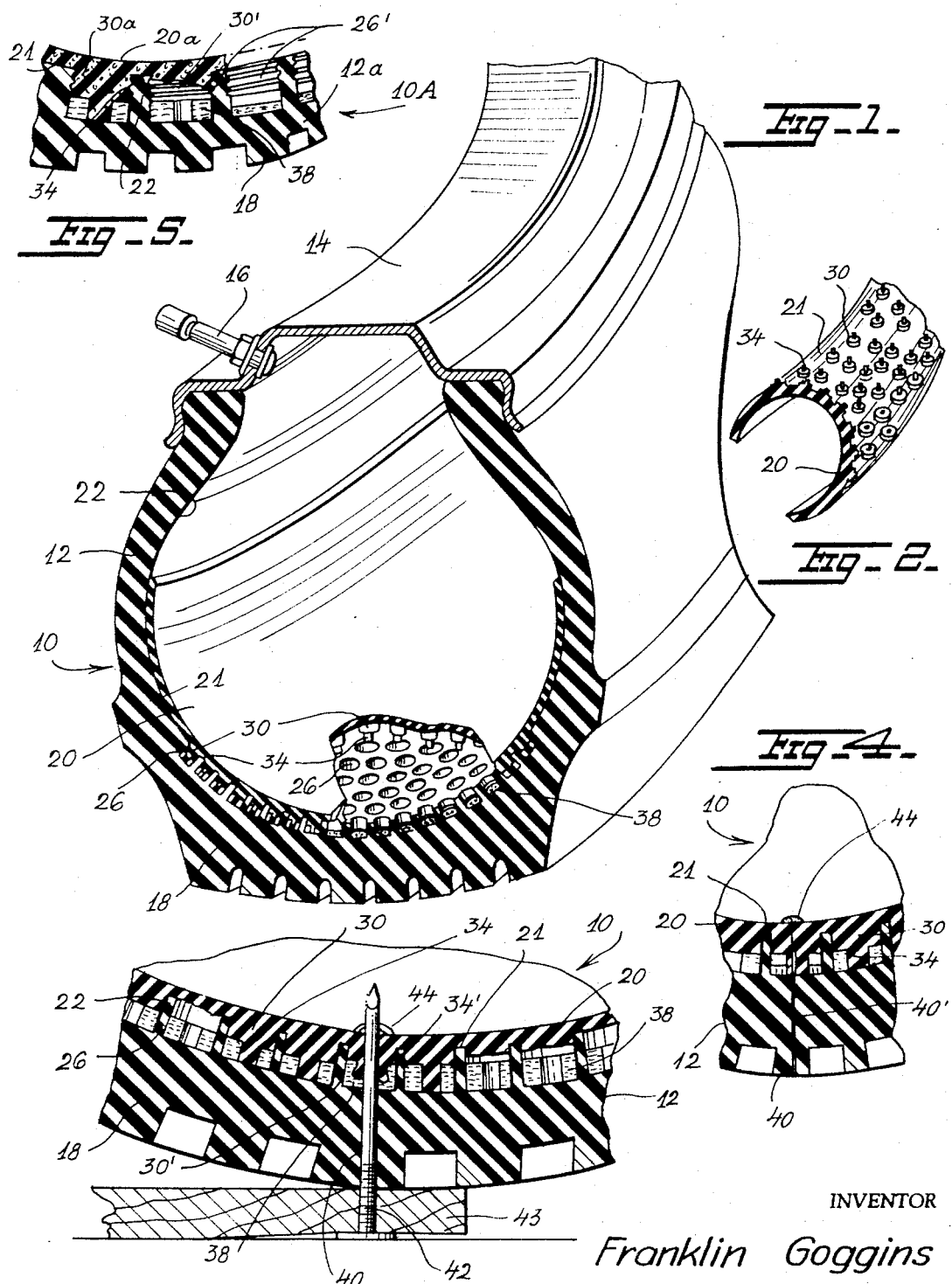

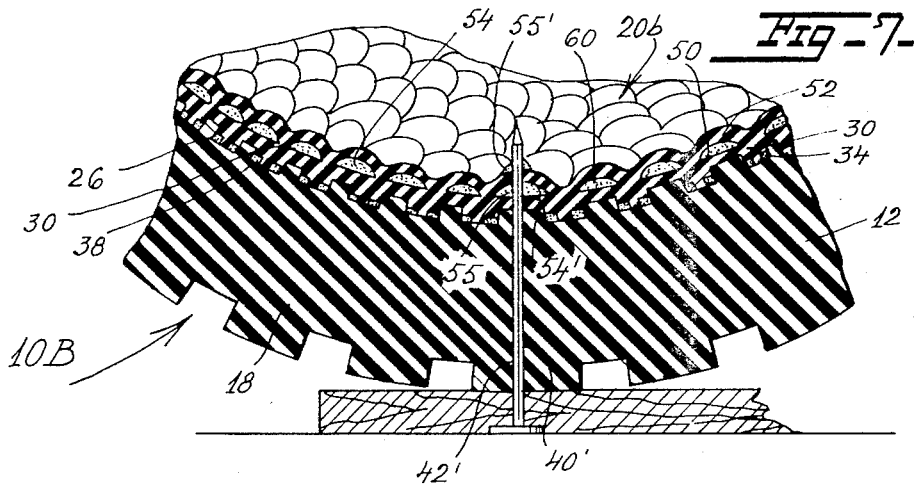
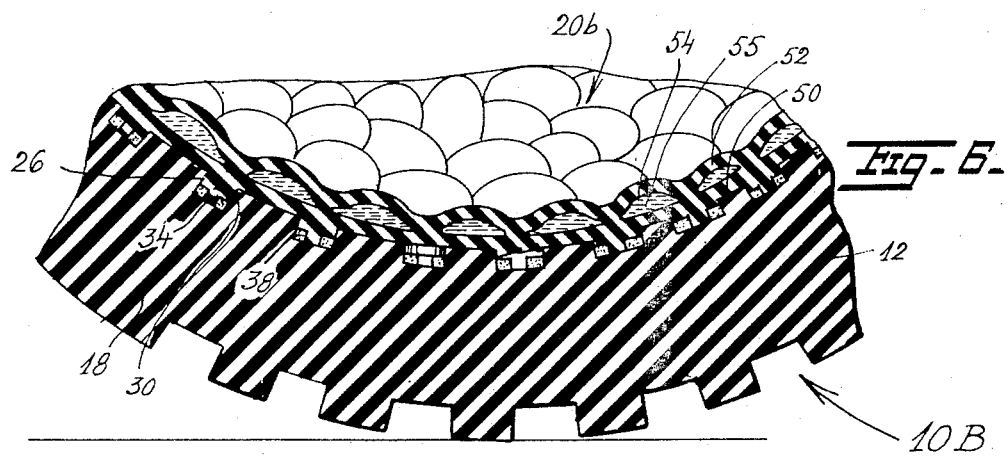
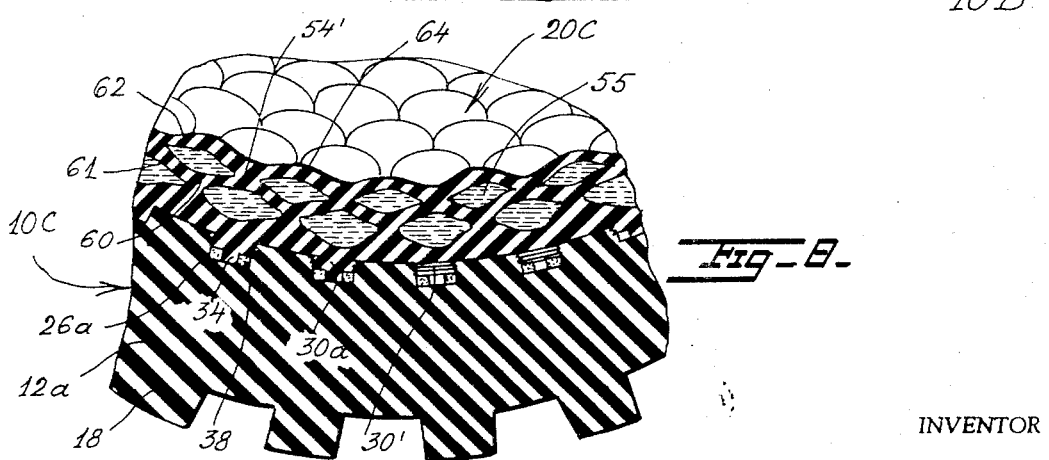

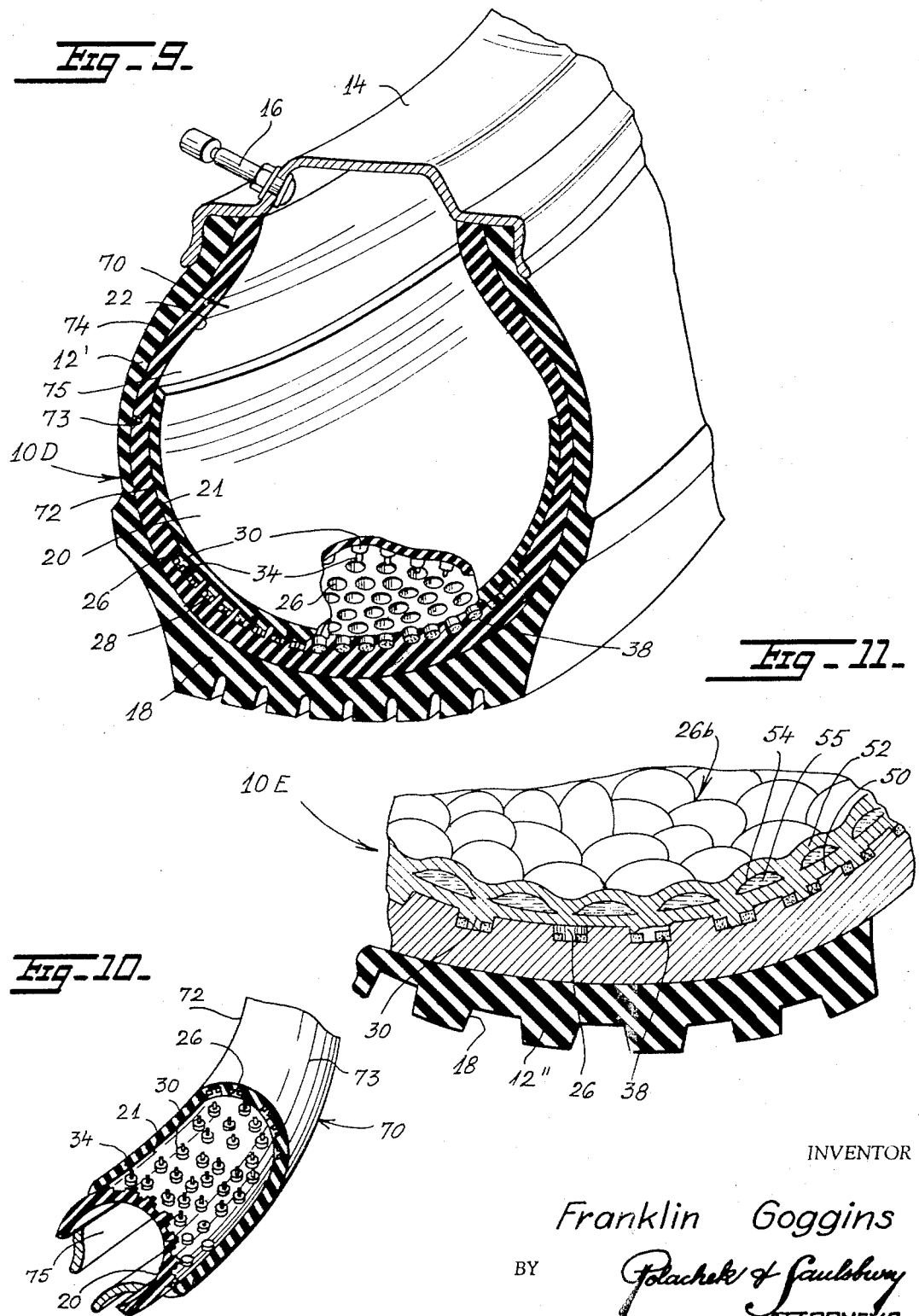

3,444,918
Patented May 20, 1969

3,444,918
SELF-SEALING SAFETY TIRE
Franklin Goggins, White Plains, N.Y., assignor to True Car Value, Inc., White Plains, N.Y., a domestic corporation
Filed Apr. 24, 1967, Ser. No. 632,956
Int. Cl. B60c 5/12
U.S. Cl. 152—347      10 Claims

ABSTRACT OF THE DISCLOSURE

The disclosure describes a safety tire having an outer or inner casing formed with pockets containing a fluid, puncture-sealing compound. Overlaying the inside of the casing is a facing or lining formed with plugs which extend into the pockets in the casing.

---

The invention relates to the art of self-sealing safety tires. It has been proposed heretofore to provide a safety tire with a sealing compound between an outer casing of tire and an inner tube, lining or inner casing. This construction has not proven wholly satisfactory because the liquid sealing compound tends to flow around the inside of the outer casing and to collect at one section forming a soft area which is highly undesirable. The remainder of the inside of the outer casing is then dry and not protected by the sealing compound. In addition, the presence of the sealing compound between the tire casing and lining or inner casing causes the lining to slip around and wrinkle. Excessive heat due to friction is generated in the tire as the lining slips with respect to the casing. This heat causes deterioration of the sealing compound. All these conditions are objectionable and defeat the basic purpose of the puncture-sealing compound.

The present invention is directed at overcoming the above difficulties and disadvantages of the prior types of self-sealing safety tires. According to the present invention, there is provided a tire or tire liner with a casing formed with a multiplicity of cylindrical pockets on its inner side. The pockets are located opposite from the grooved tread of the tire. The tire casing or liner is in turn lined with a lining formed with a multiplicity of cylindrical plugs which extend into the pockets. The plugs anchor the lining. Spaces in the pockets are filled around the plugs with a fluid, puncture-sealing compound. The plugs in the pockets prevent leakage of the sealing compound. The plugs and pockets can be formed with interfitting corrugated walls. The lining can be made of asbestos, impregnated flexible rubber or plastic to absorb heat generated by friction. The lining can be formed with closed cells containing puncture-sealing compound.

It is therefore a first object of the invention to provide a safety tire with an outer or inner casing having a multiplicity of pockets containing puncture-sealing compound.

A second object is to provide a liner or inner casing for a tire, the liner having an outer first layer formed with a multiplicity of pockets on its innerside containing puncture-sealing compound, and having an inner second layer formed with plugs on its outer side extending into the pockets in the first layer to close the same.

A third object is to provide a liner or inner casing for a tire as described above, wherein the inner second layer is further formed with closed cells containing puncture-sealing compound.

A fourth object is to provide a safety tire with an outer casing, and with an inner casing bonded to the outer casing, the inner casing having an outer first layer formed with a multiplicity of pockets on its inner side containing puncture-sealing compound and having an inner second layer formed with plugs on its outer side extending into the pockets in the first layer to close the same.

A fifth object is to provide a safety tire as last described, wherein the inner second layer is further formed with closed cells containing puncture-sealing compound.

A sixth object is to provide a safety tire having a casing formed with pockets containing puncture-sealing compound, and a lining for the casing having plugs on its outer side extending into the pockets.

A seventh object is to provide a safety tire as last described, said plugs and pockets having interfitting corrugated walls.

An eighth object is to provide a safety tire with an outer casing and a liner for the casing, said casing having pockets formed therein on its inner side and containing puncture-sealing compound, the liner having plugs on its outer side engaged in the pockets and closing the same.

For further comprehension of the invention and of the objects and advantages thereof, reference will be had to the following description and accompanying drawings and to the appended claims in which the various novel features of the invention are more particularly set forth.

In the accompanying drawings forming a material part of the disclosure:

FIGURE 1 is a fragmentary perspective view partly in section of a portion of a safety tire embodying the invention.

FIG. 2 is a reduced fragmentary perspective view of a liner employed in the tire of FIG. 1.

FIG. 3 is an enlarged fragmentary sectional view similar to a part of FIG. 1, showing how the tire is affected by a nail puncturing the tire.

FIG. 4 is a sectional view similar to a part of FIG. 3, showing a sealed puncture in the tire.

FIG. 5 is a fragmentary sectional view similar to a part of FIG. 1, illustrating another embodiment of the invention.

FIG. 6 is a fragmentary sectional view of a safety tire showing still another embodiment of the invention.

FIG. 7 is a fragmentary sectional view similar to FIG. 6 showing how the tire of FIG. 6 is affected by a puncturing nail.

FIG. 8 is a fragmentary sectional view of a further safety tire embodying another form of the invention.

FIG. 9 is a fragmentary perspective view partially in section, similar to FIG. 1, showing a tire embodying another form of the invention.

FIG. 10 is a reduced fragmentary perspective view similar to FIG. 2, showing a liner employed in the tire of FIG. 9.

FIG. 11 is a fragmentary sectional view similar to a part of FIG. 6 showing still another embodiment of the invention.

Referring first to FIGS. 1-4, there is shown a safety tire 10 having an outer annular pneumatic casing 12 sealed to an inner flanged rim 14. A valve 16 is secured to the rim.

The casing 12 has an outer circumferentially extending grooved tread 18. To the extent described the tire structure is conventional.

Now according to the invention, there is provided a resilient, nonporous rubber or artificial rubber liner 20 which is semicylindrical in cross section. The convex outer side wall 21 of the liner fits snugly against the concave inner side wall 22 of the casing. The inner side of the casing opposite the grooves in the tread is formed with staggered rows of spaced cylindrical recesses or pockets 26 closed at inner ends 28 and open to the inside of the tire. The pockets extend axially radially of the casing. The liner 20 is formed with cylindrical plugs 30 on its outer side 21 adjacent inner side 22 of the casing. The plugs are equal in diameter to the pockets 26. The plugs have cylindrical bodies which are shorter axially than the pockets. Each plug has an axial extension 34 to reduced diameter to define a toroidal chamber between the plug and pocket. Each chamber is filled with a viscous fluid, puncture-sealing compound 38 of conventional type. FIG. 2 shows the plugs 30 on the outer or convex side 21 of the liner 20.

FIG. 3 shows a puncture 40 being formed in the tire being formed in the tire by a nail 42 in board 43. The nail has penetrated casing 12 and liner 20. Some of the fluid compound has been drawn inside the liner at point 44, while the plug extension or tip 34′ is foreshortened so that compound 38 surrounds a part of nail 42 in pocket 30′. FIG. 4 shows the sealed puncture 40 after the nail 42 has been withdrawn.

The puncture is sealed by sealing compound at point 44 inside the liner and along inner part 40′ of the puncture in casing 12. This effects a complete seal of the puncture and is accomplished with substantially no loss in air from the interior of the tire.

FIG. 5 shows part of safety tire 10A in which casing 12a is formed with pockets 26a having corrugated side wall 26′. Plugs 30a of liner 20a are formed with external corrugations 30′ which interfit and engage with the corrugations in side walls 26′. This arrangement effects a more secure grip of the liner to the casing than in tire 10. Other parts of tire 10A are similar to tire 10 and corresponding parts are identically numbered. Liner 20a may be formed of resilient rubber or artificial rubber impregnated with asbestos to resist friction when the tire is in use. Liner 20 can be made of the same material.

FIGS. 6 and 7 show another tire 10B in which casing 12 is the same as in tire 10. Liner 20b is formed of two integral layers 50 and 52 formed with closed cells 54. These cells are filled with fluid, puncture-sealing compound 38 in pockets 26. The cells 54 are located so that they overlay the parts of casing 12 between pockets 26 so that all parts of the casing are protected by puncture-sealing compound held in closed pockets or cells. Plugs 30 close pockets 26.

FIG. 7 shows nail 42′ which has punctured the casing 12 and liner 20b. Some of compound 55 has been drawn out of cell 54′ to point 55′ and will be left behind to seal the puncture 40′ when the nail is withdrawn. Some of compound 55 remaining in cell 54′ will be drawn down into the puncture 40′ in casing 12 when the nail is withdrawn.

FIG. 8 shows a further tire 10C in which casing 12a is the same as the tire 10A in FIG. 5. Liner 20c is formed of three integrally joined layers 60, 61 and 62 of resilient rubber or artificial rubber or rubber impregnated with asbestos. Two layers of closed cells 54′ and 64 spaced radially of the tire are formed between the three layers. The cells 64 are staggered with respect to both cells 54′ and pockets 26a. The cells all contain puncture-sealing compound 55. By this arrangement the tire is more effectively protected than is possible with a liner without closed cells as in tires 10 and 10A, or with a liner having a single layer of cells as in tire 10B.

FIGS. 9 and 10 show a casing 70. In FIG. 9 the casing is shown inserted into outer casing 12′ of a tire 10D. The casing 70 has an outer layer 72 formed with a smooth side 73 facing the inner side 74 of the outer casing and cemented thereto. The inner side 75 of casing layer 72 is formed with a circumferentially extending array of pockets 26 which receive plugs 30 formed on the outer side 21 of inner lining or layer 20. As in tire 10, the plugs seal the pockets which are filled with puncture-sealing compound, 38. The tips 34 of the plugs extend out to the ends 28 of the pockets.

Other parts corresponding to those of tire 10 are identically numbered.

FIG. 10 shows that casing 70 can be fabricated as a separate article of manufacture. The casing can be inserted and cemented into place in any conventional tire, either a tubeless one, or one with a separate inner tube. FIG. 9 shows casing 70 inserted in a tubeless tire. The casing 70 can alternatively just as well be inserted between an outer casing and tube of a conventional pneumatic tire.

FIG. 11 shows tire 10E in which casing 70a is a separate assembly which has been secured inside of outer casing 12′. The inner casing 70a is provided with cylindrical pockets 26 on the inner side 75′ of its outer layer 72′. Plugs 30 of inner lining layer 20b seal pockets 26 which contain puncture-sealing compound 38 in the same manner as in tire 10B of FIG. 6. Other parts of tire 10E corresponding to those of tire 10B are identically numbered. Inner lining 20b is applied to the inner side 75′ of layer 72′. This layer has closed cells 54 filled with puncture-sealing compound 55. The cells are interspersed or alternated with plugs 26.

It will be apparent from the foregoing that the pockets can form in the outer layer of a casing which can be inserted into the outer casing of a tire, or the pockets can be formed in the outer casing of a tire. In either case the lining with outwardly extending plugs will be applied as to be anchored to the adjacent casing with the plugs securely engaged in the pockets.

The sealing compound is prevented from leaking out of the pockets so that it cannot collect in one or more scattered spots. The liners 20, 20a, 20b, and 20c are effectively held in place by the plugs in the pockets 30 or 30a so that they cannot slip or ride around inside the casings. More effective protection of the tire is thus obtained than is possible with prior safety tires of conventional construction as pointed out above.

While I have illustrated and described the preferred embodiments of my invention, it is to be understood that I do not limit myself to the precise construction herein disclosed and that various changes and modifications may be made within the scope of the invention.

What is claimed is:

1. A self-sealing safety tire comprising annular casing having a concave inner side wall formed with a multiplicity of spaced pockets circumferentially of said wall and disposed axially in positions radially of the casing, said pockets having outer closed ends and having inner ends open to the interior of the casing, a flexible non-porous liner abutted to the inner wall of the casing and extending circumferentially thereof to cover the pockets, said liner having a multiplicity of cylindrical plugs respectively extending into said pockets with ends of the plugs spaced from the closed ends of the pockets to define chambers therein, and fluid, puncture-sealing compound filling said chambers, said plugs fitting snugly into the pockets to prevent the sealing compound from leaking out of the pockets and to prevent the liner from displacement inside the casing, each of said plugs having an axial extension of reduced diameter abutting the closed end of a pocket to stiffen the plugs radially of the casing.

2. A self-sealing safety tire as recited in claim 1, wherein each of said pockets has a corrugated inner wall, and wherein each of said plugs has a corrugated external wall interfitting with the corrugated wall of a pocket to prevent axial displacement of the plugs from the pockets.

3. A self-sealing safety tire as recited in claim 1, wherein said liner is formed with a multiplicity of closed cells staggered with respect to said plugs and pockets, and other fluid, puncture-sealing compound filling the closed cells.

4. A self-sealing safety tire as recited in claim 3, further comprising another annular casing, the first named casing having an outer convex side abutted to the inside of said other casing and secured thereto, and a grooved tread formed on the outside of said other casing in opposing relationship to the pockets and plugs of the first casing and liner.

5. A self-sealing safety tire as recited in claim 1, wherein said liner has a plurality of layers, a plurality of layers of spaced closed cells formed between the layers, the cells in one layer being staggered with respect to the cells in the other layer, and other fluid, puncture-sealing compound filling all the closed cells.

6. A self-sealing safety tire as recited in claim 5, further comprising another annular casing, the first named casing having an outer convex side abutted to the inside of said other casing and secured thereto, and a grooved tread formed on the outside of said other casing in opposing relationship to the pockets and plugs of the first casing and liner.

7. A self-sealing safety tire as recited in claim 1, wherein said liner is formed of resilient material impregnated with asbestos to absorb heat generated by friction.

8. A self-sealing safety tire as recited in claim 1, further comprising another annular casing, the first named casing having an outer convex side abutted to the inside of said other casing and secured thereto, and a grooved tread formed on the outside of said other casing in opposing relationship to the pockets and plugs of the first casing and liner.

9. A self-sealing safety tire as recited in claim 6, wherein each of said pockets has a corrugated inner wall, and wherein each of said plugs has a corrugated external wall interfitting with the corrugated wall of a pocket to prevent axial displacement of the plugs from the pockets.

10. A self-sealing safety tire as recited in claim 8, wherein said liner is formed of resilient material impregnated with asbestos to absorb heat generated by friction.

References Cited

UNITED STATES PATENTS

| | | | |
|---|---|---|---|
| 1,392,826 | 10/1921 | Gordon et al. | 152—347 |
| 1,977,281 | 10/1934 | Knowlton | 152—346 |
| 2,712,847 | 7/1955 | Harris | 152—347 |
| 2,877,819 | 3/1959 | Gibbs | 152—347 |

ARTHUR L. LA POINT, *Primary Examiner.*

C. B. LYON, *Assistant Examiner.*